United States Patent Office 2,793,232
Patented May 21, 1957

2,793,232

DEHYDROABIETIC ACID DERIVATIVES AND METHOD FOR MAKING THE SAME

Peter Farrelly, Newark, and Eric O. Ridgway, Scotch Plains, N. J., assignors to Ridbo Laboratories, Inc., Trenton, N. J., a corporation of New Jersey No Drawing. Application September 23, 1953, Serial No. 381,982

4 Claims. (Cl. 260—586)

This invention relates to certain dehydroabietic acid derivatives and method for making the same.

In some respects, the present invention constitutes an improvement on the invention disclosed in Zeiss U. S. Patent No. 2,540,157, issued February 6, 1951. As there disclosed, when dehydroabietic acid is esterified with an alkyl alcohol, for instance methyl alcohol or ethyl alcohol, and thereafter the ester is treated with a Grignard reagent, tertiary rosin alcohols are formed. As is further disclosed in said Zeiss patent, when the treatment is carried out with an aryl Grignard reagent, such as phenyl magnesium bromide, the tertiary rosin alcohol produced is diphenyl-t-dehydroabietinol. The method described in said Zeiss patent apparently resulted in production of certain dehydroabietinols in a crude state, i. e., in admixtures with other constituents, as is stated, for example, in Example 1 of said Zeiss patent.

We have found that by adopting certain new procedural steps we are able to obtain increased yields of the carbinol diphenyl-t-dehydroabietinol in substantially pure form. We have further found that certain additional treatment steps may be applied to the crude reaction product formed by the Grignard reagent, so as to derive therefrom not only the diphenyl-t-dehydroabietinol in good yield but also certain other compounds, notably dehydroabietinophenone.

In a typical treatment according to this invention the methyl ester of dehydroabietic acid is dissolved in anhydrous ether. A solution of phenyl magnesium bromide in ether is also prepared and then the solutions combined, as by adding the first solution drop-wise to the second, at reflux temperature.

After completion of the reaction, the mass is hydrolyzed by slow addition to an ice cold concentrated ammonium chloride solution. The hydrolyzed reaction mass is then permitted to stratify. The ether layer is then separated and recovered; and the ether is then removed therefrom under vacuum.

The foregoing portions of the treatment substantially conform with certain portions of the treatment referred to in the Zeiss patent above identified, and result in the production of a mass containing the diphenyl-t-dehydroabietinol and other constituents.

According to the invention, this crude reaction mass, i. e., the mass remaining after removal of the ether, is taken up in hexane. Although the mass taken up in the hexane contains a number of compounds, we have found that the hexane provides for selective crystallization of the diphenyl-t-dehydroabietinol in good yield and in substantially pure form. Crystallization of the diphenyl-t-dehydroabietinol from the hexane solution takes place at temperatures below about 40° C., it being preferred to maintain a temperature well below this figure, for instance below about 20° C. Temperatures in the range from about 0 to about 5° C. are especially effective.

The crystals initially formed from the hexane solution may be filtered out and the mother liquor subjected to repeated crystallizations in the same way.

After crystallization and separation of the diphenyl-t-dehydroabietinol, the mother liquor may be treated to remove the hexane, as for example by distillation under reduced pressure, and thereupon the remainder of the reaction mass is distilled, preferably under high vacuum. This initially effects separation of the by-products of the Grignard reaction, such as diphenyl where phenyl Grignard reagents are employed. After the by-products of the Grignard reaction have been removed, dehydroabietinophenone comes over in substantially pure form, leaving only a small undistilled residue.

According to the foregoing procedure two compounds are obtained in substantially pure form. Both of these compounds are useful because of their physiological activity and further because they may be employed as intermediates in the production of other compounds. The two compounds formed have the structural formulae indicated below:

*Diphenyl-t-dehydroabietinol*

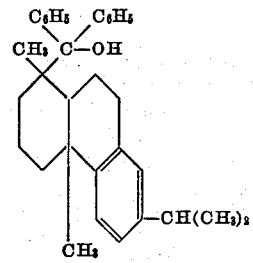

*Dehydroabietinophenone*

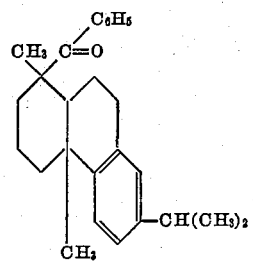

Dehydroabietinophenone is a new compound and if desired, the yield of this particular compound may be varied in relation to the quantity of tertiary rosin alcohol produced, by varying the molecular ratio of the Grignard reagent used in the treatment of the dehydroabietic acid ester. For maximum yield of the diphenyl-t-dehydroabietinol the quantity of Grignard reagent should be equal to two mols to 1 mol of the dehydroabietic acid ester. On the other hand, for increased yields of the dehydroabietinophenone the molecular ratio is preferably 1:1.

Where it is desired to obtain the maximum yield of dehydroabietinophenone, the reaction mass resulting from the treatment with the Grignard reagent may be directly fractionally distilled under vacuum (after removal of the ether), in order to separate out that fraction representing this particular compound.

When operating under conditions adapted to secure maximum yield of the diphenyl-t-dehydroabietinol, yields of the order of about 50% to 70% are obtainable calculated on the basis of the dehydroabietic acid ester taken for treatment. On the other hand, when operating under conditions adapted to secure maximum yield of dehydroabietinophenone, yields of the order of about 60% to 80% are obtainable calculated on the basis of the dehydroabietic acid ester taken for treatment.

It is to be noted that employment of distillation, as suggested above, for obtaining maximum yield of the phenone will degrade or decompose the dehydroabietinol at least in large part, if not completely.

When it is desired to obtain maximum yield of the dehydroabietinol, it is of great importance to avoid high temperatures either in distillation or any other processing steps. Thus the maintenance of a relatively low temperature, preferably below 40° C. until after the tertiary alcohol has been removed, is of advantage whenever high yields of the tertiary alcohol are desired. It is also of great importance in the crystallization in obtaining a high yield of the tertiary rosin alcohol to utilize hexane, as above indicated, since this specific solvent has been found to provide highly selective separation of the tertiary rosin alcohol from the crude mass. Indeed, so far as we are aware, hexane is the only solvent capable of providing any substantial yield of the tertiary rosin alcohol from the crude mass obtained from the hydrolysis. Actual tests with certain other solvents, including petroleum ether and certain alcohols, such as butyl alcohol, did not result in any measurable yield.

As a Grignard reagent it is preferred to use phenyl magnesium bromide; however, other phenyl magnesium derivatives such as the iodide or chloride may be so employed. From the standpoint of production of high yields of both of the compounds referred to it is also of importance to effect hydrolysis of the reaction mass formed by the treatment wtih the Grignard reagent, by employing a relatively mild hydrolyzing technique. In the preferred practice of the invention the hydrolysis is effected by using concentrated aqueous ammonium chloride solution at low temperature, desirably close to 0° C.

*Example 1.*—21 g. of magnesium metal turnings and 50 cc. of anhydrous dimethyl ether, together with a crystal of iodine were placed in a three liter, three neck flask, equipped with a stirrer, reflux condenser and dropping funnel. The apparatus was protected from atmospheric moisture with drying tubes containing calcium chloride. To this was added dropwise 129 g. of bromobenzene in 300 cc. of anhydrous ether, the rate of addition being such as to maintain reflux.

After 2 hours 114 g. of methyl dehydroabietate dissolved in 300 cc. of ether was added dropwise into the refluxing mixture. This addition required about an hour. Refluxing was continued for about 3 hours.

After cooling to room temperature the reaction mass was hydrolyzed by slow addition to a concentrated aqueous solution of ammonium chloride, with strong agitation. This hydrolysis was effected in a reaction vessel cooled in an ice bath.

After settling and stratification, the ether layer was separated and dried over sodium sulphate. The ether was then driven off under vacuum and the reaction mass dissolved in a minimum amount of dry hexane at slightly above room temperature. Crystals of diphenyl-t-dehydroabietinol formed during the course of several hours standing at a temperature in the neighborhood of 0° C. and these were separated, and then successive crops of crystals were recovered from the mother liquor.

The white crystal product obtained in this way (diphenyl-t-dehydroabietinol) melted at 139–140° C.

*Example 2.*—1 g. mol of the crude reaction product prepared as shown in Example 1 was fractionated in a short path still to remove low boiling fractions and to recover the fraction boiling between about 105 to 108° C. at $5 \times 10^{-5}$ mm. Hg. This fraction was identified as dehydroabietinophenone. This is a continuation-in-part of application Serial No. 243,761 filed August 25, 1951, now abandoned.

We claim:

1. In the production of diphenyl-t-dehydroabietinol by reacting an alkyl ester of dehydroabietic acid with an unsubstituted phenyl Grignard reagent, the method which comprises effecting separation of diphenyl-t-dehydroabietinol from the reaction mass by crystallization of the diphenyl-t-dehydroabietinol from a solution of the reaction mass in hexane at a temperature below about 20° C.

2. In the production of unsubstituted aryl dehydroabietic acid derivatives from alkyl esters of dehydroabietic acid by reacting such a dehydroabietic acid ester with an unsubstituted phenyl Grignard reagent, the method which comprises separating diphenyl-t-dehydroabietinol from the reaction mass by crystallization thereof from a solution of said mass in hexane, at a temperature below about 20° C., and thereafter separating dehydroabietinophenone from said mass by fractional distillation.

3. The method according to claim 1 wherein the molecular ratio of the ester to the reagent is about 1:1.

4. The method according to claim 2 wherein the molecular ratio of the ester to the reagent is about 1:1.

References Cited in the file of this patent

UNITED STATES PATENTS

| | | |
|---|---|---|
| 2,207,890 | Littman | July 16, 1940 |
| 2,274,524 | Borglin | Feb. 24, 1942 |
| 2,359,826 | Campbell | Oct. 10, 1944 |
| 2,472,437 | Pratt | June 7, 1949 |
| 2,532,137 | Zeiss | Nov. 28, 1950 |
| 2,540,157 | Zeiss | Feb. 6, 1951 |
| 2,656,345 | Jacobsen | Oct. 20, 1953 |